(12) United States Patent
Kubodera et al.

(10) Patent No.: US 10,676,491 B1
(45) Date of Patent: Jun. 9, 2020

(54) ISOCYANURIC ACID DERIVATIVE HAVING ALKOXYALKYL GROUPS AND METHOD FOR PRODUCING THE SAME

(71) Applicant: NISSAN CHEMICAL CORPORATION, Tokyo (JP)

(72) Inventors: Shun Kubodera, Toyama (JP); Yuichi Goto, Toyama (JP); Wataru Shibayama, Toyama (JP); Gun Son, Toyama (JP)

(73) Assignee: NISSAN CHEMICAL CORPORATION, Tokyo (JP)

( * ) Notice: Subject to any disclaimer, the term of this patent is extended or adjusted under 35 U.S.C. 154(b) by 0 days.

(21) Appl. No.: 16/627,700

(22) PCT Filed: May 29, 2018

(86) PCT No.: PCT/JP2018/020555
§ 371 (c)(1),
(2) Date: Dec. 30, 2019

(87) PCT Pub. No.: WO2019/003767
PCT Pub. Date: Jan. 3, 2019

(30) Foreign Application Priority Data

Jun. 28, 2017 (JP) ................... 2017-126007

(51) Int. Cl.
*C07F 7/18* (2006.01)
(52) U.S. Cl.
CPC .................. *C07F 7/1876* (2013.01)
(58) Field of Classification Search
None
See application file for complete search history.

(56) References Cited

U.S. PATENT DOCUMENTS

2012/0315765 A1* 12/2012 Nakajima ............... G03F 7/094
438/694

* cited by examiner

*Primary Examiner* — Clinton A Brooks
(74) *Attorney, Agent, or Firm* — Oliff PLC

(57) ABSTRACT

There is provided a novel isocyanuric acid derivative having two alkoxyalkyl groups and having a trialkoxysilyl group introduced therein, and a method for producing the isocyanuric acid derivative.

An isocyanuric acid derivative of formula (1):

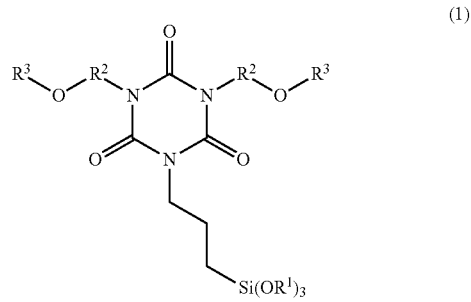

(1)

wherein $R^1$ is a methyl group or an ethyl group; two $R^2$s are each a $C_{1-2}$ alkylene group; and two $R^3$s are each a methyl group, an ethyl group, or a $C_{2-4}$ alkoxyalkyl group, which may be liquid at ambient temperature and ambient pressure.

5 Claims, No Drawings

ISOCYANURIC ACID DERIVATIVE HAVING ALKOXYALKYL GROUPS AND METHOD FOR PRODUCING THE SAME

TECHNICAL FIELD

The present invention relates to a novel isocyanuric acid derivative having two alkoxyalkyl groups and having a trialkoxysilyl group introduced therein, and a method for producing the isocyanuric acid derivative.

BACKGROUND ART

Patent Document 1 discloses in the Examples that monoallyl isocyanurate and triethoxysilane are reacted to obtain an isocyanuric acid derivative of formula (E-2):

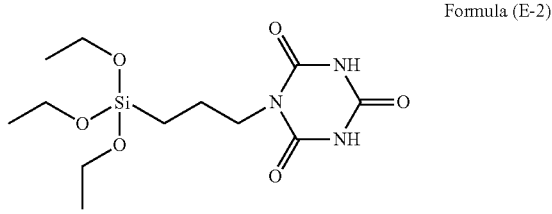 [SMILES: CCO[Si](CCCn1c(=O)[nH]c(=O)[nH]c1=O)(OCC)OCC]

Formula (E-2)

and the obtained isocyanuric acid derivative, tetraethoxysilane, methyltriethoxysilane, and phenyltrimethoxysilane are used to obtain a polymer of formula (3-5):

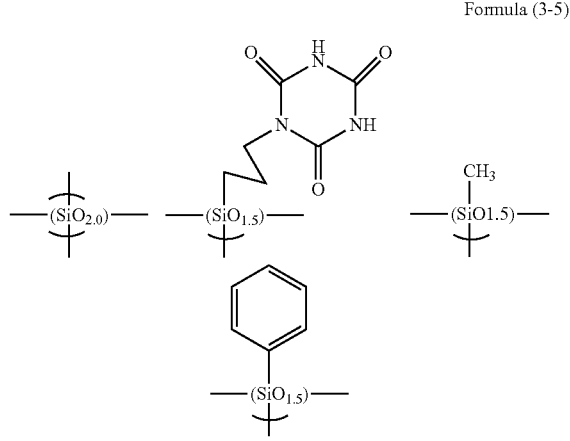

Formula (3-5)

and further discloses that a resist underlayer film-forming composition is prepared using the obtained polymer. Patent Document 1, however, does not disclose an isocyanuric acid derivative having two alkoxyalkyl groups.

PRIOR ART DOCUMENTS

Patent Document

Patent Document 1: International Publication WO 2011/102470

SUMMARY OF THE INVENTION

Problem to be Solved by the Invention

An object of the present invention is to provide a novel isocyanuric acid derivative that is expected to be used as a raw material of a resist underlayer film-forming composition, for example.

Means for Solving the Problem

The inventors of the present invention obtained an isocyanuric acid derivative having two alkoxyalkyl groups and having a trialkoxysilyl group introduced therein, by using monoallyl isocyanurate as a starting material. In summary, the present invention is an isocyanuric acid derivative of formula (1):

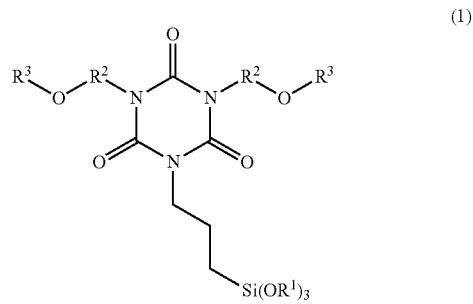

(1)

(wherein $R^1$ is a methyl group or an ethyl group; two $R^2$s are each a $C_{1-2}$ alkylene group; and two $R^3$s are each a methyl group, an ethyl group, or a $C_{2-4}$ alkoxyalkyl group).

The isocyanuric acid derivative of formula (1) is liquid at ambient temperature and ambient pressure. As used herein, the "ambient temperature and ambient pressure" is defined as a temperature of 20 to 25° C. and an atmospheric pressure of 101 kPa.

The present invention is also a method for producing the isocyanuric acid derivative comprising the steps of:

reacting monoallyl isocyanurate and an alkali metal carbonate, and reacting the resulting reaction product and a compound of formula (a) to obtain an intermediate of formula (b); and performing a hydrosilylation reaction of the intermediate of formula (b) and a silane compound of formula (c) to obtain the isocyanuric acid derivative of formula (1):

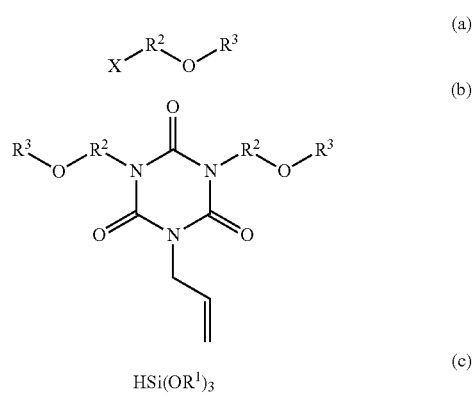

(wherein $R^1$, $R^2$, and $R^3$ are as defined above in formula (1); and X is a chlorine atom, a bromine atom, or an iodine atom).

The compound of formula (a) is selected from the group consisting of, for example, compounds of formulae (a-1) to (a-10):

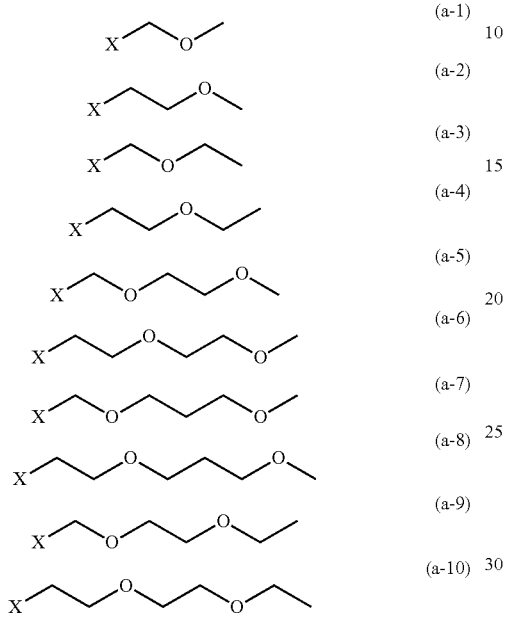

(wherein X is as defined above in formula (a)).

The alkali metal carbonate is potassium carbonate or cesium carbonate, for example.

Effects of the Invention

The isocyanuric acid derivative of the present invention is expected to be used as a raw material of a polymer or an oligomer component for a resist underlayer film-forming composition or the like. Because the isocyanuric acid derivative is obtained as a liquid at ambient temperature, it can be purified by distillation. This can reduce the amount of residual metal derived from a catalyst used for the synthesis of the isocyanuric acid derivative. In general, the resist underlayer film-forming composition is required to be free of metal impurities or contain a minimal amount of metal impurities. On the other hand, the isocyanuric acid derivative of formula (E-2) obtained in the invention disclosed in Patent Document 1 is solid at ambient temperature, and thus, cannot be purified by distillation.

MODES FOR CARRYING OUT THE INVENTION

The isocyanuric acid derivative of the present invention is a compound of formula (1) having two alkoxyalkyl groups and having a trialkoxysilyl group introduced therein. Examples of the $C_{1-2}$ alkylene group of $R^2$ in formula (1) include methylene group and ethylene group. The $C_{2-4}$ alkoxyalkyl group of $R^3$ in formula (1) may be either linear or branched, and examples of the alkoxyalkyl group include methoxymethyl group, ethoxymethyl group, propoxymethyl group, isopropoxymethyl group, methoxyethyl group, ethoxyethyl group, and methoxypropyl group.

Examples of the isocyanuric acid derivative of the present invention include compounds of formulae (1-1) to (1-9). In the formulae, "Et" refers to ethyl group.

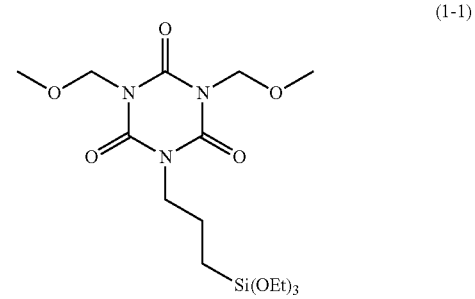
(1-1)

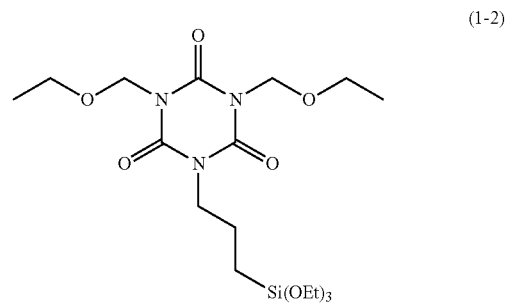
(1-2)

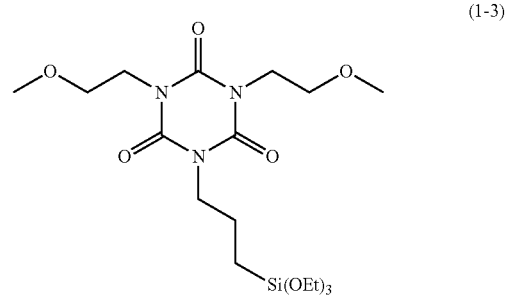
(1-3)

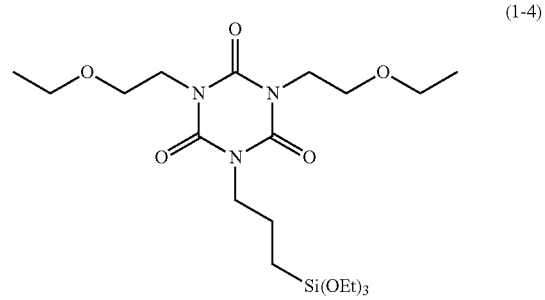
(1-4)

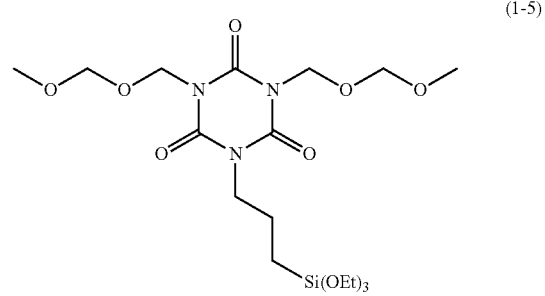
(1-5)

-continued (1-6)
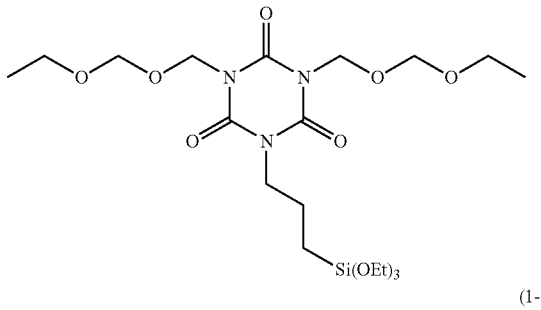

(1-7)
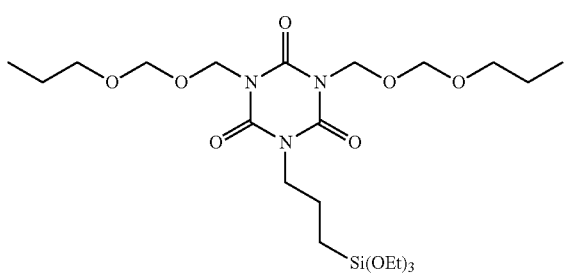

(1-8)
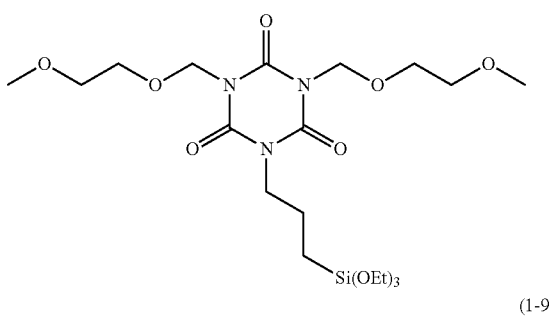

(1-9)
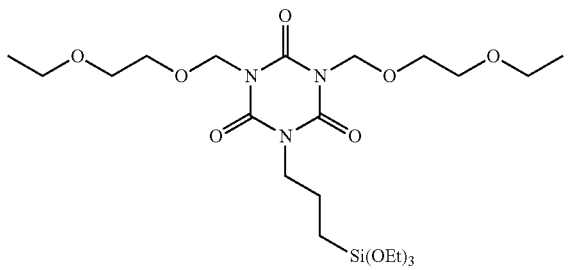

The isocyanuric acid derivative of the present invention is obtained by the steps of reacting monoallyl isocyanurate and an alkali metal carbonate, and reacting the resulting reaction product and a compound of formula (a) to obtain an intermediate of formula (b); and performing a hydrosilylation reaction of the intermediate of formula (b) and a silane compound of formula (c). The step of obtaining the intermediate is characterized by being performed in two steps, in order to avoid the compound of formula (a) from reacting preferentially with the alkali metal carbonate. When monoallyl isocyanurate is reacted with the alkali metal carbonate, the hydrogen atoms attached to the nitrogen atoms are extracted from the monoallyl isocyanurate. In the hydrosilylation reaction, the allyl group of the intermediate and the silane compound are reacted using a transition metal catalyst. While a platinum catalyst is typically used as the transition metal catalyst, the platinum catalyst, which contains a noble metal, is expensive; therefore, transition metal catalysts available at lower cost have been studied. Examples of the platinum catalyst include Karstedt's catalyst and chloroplatinic acid.

EXAMPLES

The present invention will be hereinafter described using specific examples; however, the present invention is not necessarily limited to the following specific examples.

Method for Calculating Yield

The yield shown in each of the synthesis examples and examples described below was calculated in percentage, by using the mass of the obtained compound and the theoretical yield. The theoretical yield was calculated by multiplying the number of moles of the raw material compound used for the synthesis, by the molecular weight of the obtained compound.

Synthesis of Raw Material Compound

Synthesis Example 1

A 2-L four-necked flask was charged with 150.0 g of monoallyl isocyanurate (manufactured by Shikoku Chemicals Corporation), 750 g of N-methyl-2-pyrrolidinone, and 306.4 g of potassium carbonate, and the contents were stirred at 25° C. Thereafter, the mixture in the flask was cooled to 0 to 5° C., 178.5 g of chloromethylmethyl ether (manufactured by Tokyo Chemical Industry Co., Ltd.) was added dropwise to the cooled mixture in such a manner that the temperature of the mixture became 5° C. or less, and after the dropwise addition, the mixture was heated to 25° C. and reacted for 2.5 hours. After the reaction, the resulting reaction mixture was diluted by adding 1500 g of ethyl acetate, and then filtered to be separated into a filtrate and a filtered product. Thereafter, the filtered product was washed twice with 150 g of ethyl acetate, and the target product remaining in the filtered product was collected as an ethyl acetate solution. Subsequently, the collected ethyl acetate solution was added to the filtrate, and the mixture was partitioned three times with 1500 g of ion exchange water to extract the organic phase. The ethyl acetate was then removed from the organic phase using an evaporator to obtain the target compound of formula (b-1) as a transparent viscous liquid (yield 66.0%).

(b-1)
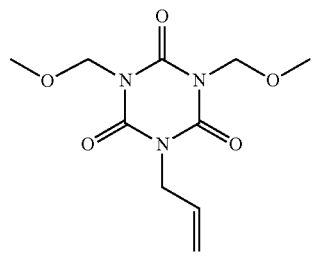

The obtained compound was identified by measuring a $^1$H-NMR spectrum. The results are shown below. The solvent used in the measurement was deuterated chloroform, the measurement temperature was room temperature, and the standard sample was tetramethylsilane (TMS).

$^1$H-NMR (500 MHz): 3.46-3.47 ppm (s, 6H), 4.45-4.55 ppm (d, 2H), 5.25-5.36 ppm (m, 6H), 5.86-5.90 ppm (m, 1H)

Synthesis Example 2

A 500-mL four-necked flask was charged with 20.0 g of monoallyl isocyanurate (manufactured by Shikoku Chemicals Corporation), 100.0 g of N-methyl-2-pyrrolidinone, and 40.86 g of potassium carbonate, and the contents were stirred at 25° C. Thereafter, the mixture in the flask was cooled to 0 to 5° C., 38.76 g of 2-methoxyethoxymethyl chloride (manufactured by Tokyo Chemical Industry Co., Ltd.) was added dropwise to the cooled mixture in such a manner that the temperature of the mixture became 5° C. or less, and after the dropwise addition, the mixture was heated to 25° C. and reacted for 2.5 hours. After the reaction, the resulting reaction mixture was diluted by adding 200 g of toluene, and then filtered to be separated into a filtrate and a filtered product. Thereafter, the filtered product was washed twice with 20 g of toluene, and the target product remaining in the filtered product was collected as a toluene solution. Subsequently, the collected toluene solution was added to the filtrate, and the mixture was partitioned three times with 200 g of ion exchange water to extract the organic phase. The toluene was then removed from the organic phase using an evaporator to obtain the target compound of formula (b-2) as a transparent viscous liquid (yield 42.3%).

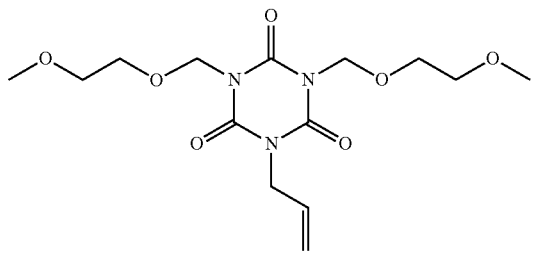

(b-2)

The obtained compound was identified by measuring a $^1$H-NMR spectrum. The results are shown below. The solvent used in the measurement was deuterated dimethyl sulfoxide, the measurement temperature was room temperature, and the standard sample was tetramethylsilane (TMS).

$^1$H-NMR (500 MHz): 3.19-3.22 ppm (s, 6H), 3.37-3.42 ppm (t, 4H), 3.62-3.68 ppm (t, 4H), 4.34-4.38 ppm (dd, 2H), 5.19-5.24 ppm (m, 6H), 5.79-5.86 ppm (m, 1H)

Example 1

A 300-mL four-necked flask was charged with 15.0 g of the compound of formula (b-1) obtained in Synthesis Example 1, 75.0 g of toluene, and 0.56 g of Karstedt's catalyst [platinum(0)-1,3-divinyl-1,1,3,3-tetramethyldisiloxane complex solution in xylene (containing ~2% by mass of platinum)] (manufactured by Sigma-Aldrich Co. LLC.), and the contents were stirred at 25° C. Thereafter, 28.67 g of triethoxysilane (manufactured by Tokyo Chemical Industry Co., Ltd.) was added dropwise to the mixture in the flask in such a manner that the temperature of the mixture became 30° C. or less, and after the dropwise addition, the mixture was heated to 100° C. and reacted for 2 hours. After the reaction, 150 g of dichloromethane was added to the resulting reaction mixture, and the mixture was partitioned twice with 75 g of ion exchange water to extract the organic phase. The dichloromethane, the toluene, and the triethoxysilane contained in excess were then removed from the organic phase using an evaporator to obtain a crude product. The obtained crude product was purified by distillation to obtain the target compound of formula (1-1) as a transparent viscous liquid (yield 37.4%).

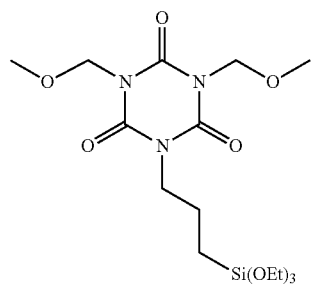

(1-1)

The obtained compound was identified by measuring a $^1$H-NMR spectrum. The results are shown below. The solvent used in the measurement was deuterated dimethyl sulfoxide, the measurement temperature was room temperature, and the standard sample was tetramethylsilane (TMS).

$^1$H-NMR (500 MHz): 0.50-0.60 ppm (m, 2H), 1.10-1.20 ppm (t, 9H), 1.55-1.65 ppm (m, 2H), 3.26-3.35 ppm (s, 6H), 3.68-3.82 ppm (m, 8H), 5.13-5.18 ppm (s, 4H)

Example 2

A 500-mL four-necked flask was charged with 48.52 g of the compound of formula (b-2) obtained in Synthesis Example 2, 242.6 g of toluene, and 1.34 g of Karstedt's catalyst [platinum(0)-1,3-divinyl-1,1,3,3-tetramethyldisiloxane complex solution in xylene (containing ~2% by mass of platinum)] (manufactured by Sigma-Aldrich Co. LLC.), and the contents were stirred at 25° C. Thereafter, 29.74 g of triethoxysilane (manufactured by Tokyo Chemical Industry Co., Ltd.) was added dropwise to the mixture in the flask in such a manner that the temperature of the mixture became 30° C. or less, and after the dropwise addition, the mixture was heated to 100° C. and reacted for 2 hours. After the reaction, 485.2 g of dichloromethane was added to the resulting reaction mixture, and the mixture was partitioned twice with 242.6 g of ion exchange water to extract the organic phase. The dichloromethane, the toluene, and the triethoxysilane contained in excess were then removed from the organic phase using an evaporator to obtain a crude product. The obtained crude product was purified by distillation to obtain the target compound of formula (1-8) as a transparent viscous liquid (yield 49.2%).

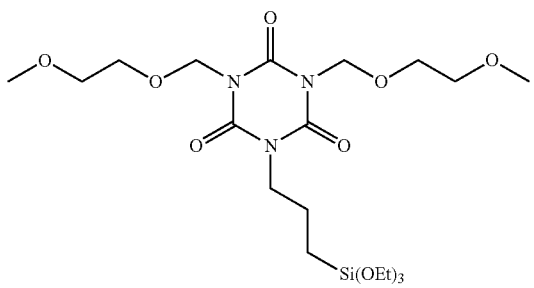

(1-8)

The obtained compound was identified by measuring a $^1$H-NMR spectrum. The results are shown below. The solvent used in the measurement was deuterated chloroform, the measurement temperature was room temperature, and the standard sample was tetramethylsilane (TMS).

$^1$H-NMR (500 MHz): 0.60-0.65 ppm (m, 2H), 1.14-1.23 ppm (t, 9H), 1.70-1.78 ppm (m, 2H), 3.30-3.33 ppm (s, 6H), 3.48-3.52 ppm (m, 4H), 3.7713-3.89 ppm (m, 12H), 5.39-5.42 ppm (s, 4H)

Comparative Example 1

A 500-mL four-necked flask was charged with 30.09 g of monoallyl isocyanurate (manufactured by Shikoku Chemicals Corporation), 150.73 g of toluene, and 1.71 g of Karstedt's catalyst [platinum(0)-1,3-divinyl-1,1,3,3-tetramethyldisiloxane complex solution in xylene (containing ~2% by mass of platinum)] (manufactured by Sigma-Aldrich Co. LLC.), and the contents were stirred at 25° C. Thereafter, 37.78 g of triethoxysilane (manufactured by Tokyo Chemical Industry Co., Ltd.) was added dropwise to the mixture in the flask in such a manner that the temperature of the mixture became 30° C. or less, and after the dropwise addition, the mixture was heated to 100° C. and reacted for 25 hours. After the reaction, the toluene and the triethoxysilane contained in excess were removed from the resulting reaction mixture using an evaporator, 303.70 g of dichloromethane was added to the resulting crude product, and the mixture was partitioned three times with 155.14 g of ion exchange water to extract the organic phase. The dichloromethane was removed from the obtained organic phase using an evaporator, 330.86 g of tetrahydrofuran was added to the resulting crude product to dissolve the crude product, and the mixture was stirred at 25° C. for 10 minutes and then filtered to be separated into a filtrate and a filtered product. Thereafter, the tetrahydrofuran was removed from the obtained filtrate using an evaporator, 276.18 g of toluene was added to the resulting crude product, and the mixture was stirred at 25° C. for 10 minutes and then filtered to be separated into a filtrate and a filtered product. Thereafter, the toluene was removed from the obtained filtered product using an evaporator to obtain the target compound of formula (2) as a pale yellow solid (yield 43.2%).

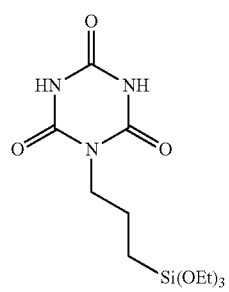

(2)

The obtained compound was identified by measuring a $^1$H-NMR spectrum. The results are shown below. The solvent used in the measurement was deuterated dimethyl sulfoxide, the measurement temperature was room temperature, and the standard sample was tetramethylsilane (TMS).

$^1$H-NMR (500 MHz): 0.50-0.60 ppm (m, 2H), 1.10-1.15 ppm (t, 9H), 1.50-1.60 ppm (m, 2H), 3.55-3.65 ppm (t, 2H), 3.48-3.52 ppm (m, 4H), 3.70-3.80 ppm (m, 6H), 11.3-11.4 ppm (s, 2H)

INDUSTRIAL APPLICABILITY

The isocyanuric acid derivative of the present invention can be used for an anti-reflective coating-forming composition for lithography, a resist underlayer film-forming composition, a resist upper layer film-forming composition, a photocurable resin composition, a thermosetting resin composition, a planarization film-forming composition, an adhesive composition, and other compositions, for example. The isocyanuric acid derivative of the present invention can also be used as a raw material compound to synthesize an oligomer or a polymer used for any of the above-described compositions.

The invention claimed is:

1. An isocyanuric acid derivative of formula (1):

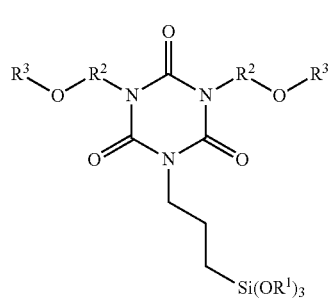

(1)

wherein $R^1$ is a methyl group or an ethyl group; two $R^2$s are each a $C_{1-2}$ alkylene group; and two $R^3$s are each a methyl group, an ethyl group, or a $C_{2-4}$ alkoxyalkyl group.

2. The isocyanuric acid derivative according to claim 1, wherein the isocyanuric acid derivative is liquid at ambient temperature and ambient pressure.

3. A method for producing the isocyanuric acid derivative according to claim 1 comprising the steps of:
reacting monoallyl isocyanurate and an alkali metal carbonate, and reacting the resulting reaction product and a compound of formula (a) to obtain an intermediate of formula (b); and
performing a hydrosilylation reaction of the intermediate of formula (b) and a silane compound of formula (c) to obtain the isocyanuric acid derivative of formula (1):

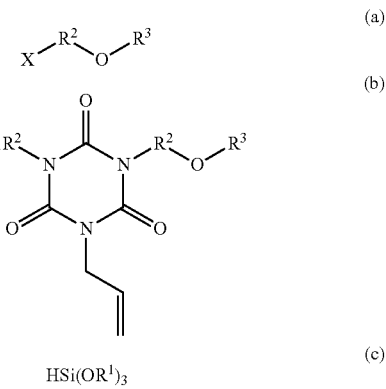

(wherein $R^1$, $R^2$, and $R^3$ are as defined above in formula (1); and X is a chlorine atom, a bromine atom, or an iodine atom.

4. The method for producing the isocyanuric acid derivative according to claim 3, wherein the compound of formula (a) is selected from the group consisting of compounds of formulae (a-1) to (a-10):

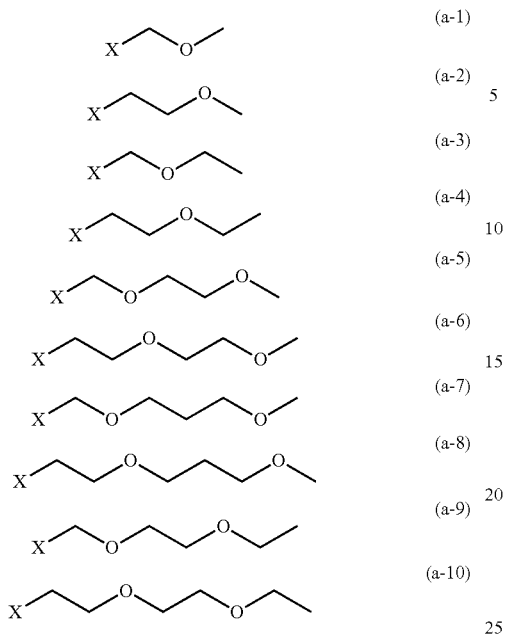
(wherein X is as defined above in formula (a).
5. The method for producing the isocyanuric acid derivative according to claim 3, wherein the alkali metal carbonate is potassium carbonate or cesium carbonate.
* * * * *